United States Patent
Borel et al.

(10) Patent No.: US 7,511,635 B2
(45) Date of Patent: Mar. 31, 2009

(54) AUTOMATIC METHOD FOR TRANSMITTING MONITORING ALARMS FROM AN AIRCRAFT TO THE GROUND

(75) Inventors: Matthieu Borel, Toulouse (FR); Nicolas Rossi, Toulouse (FR); Michel Subelet, Cugnaux (FR)

(73) Assignee: Thales, Neuilly sur Seine (FR)

( * ) Notice: Subject to any disclaimer, the term of this patent is extended or adjusted under 35 U.S.C. 154(b) by 216 days.

(21) Appl. No.: 10/587,364

(22) PCT Filed: Feb. 4, 2005

(86) PCT No.: PCT/EP2005/050494

§ 371 (c)(1),
(2), (4) Date: Jul. 27, 2006

(87) PCT Pub. No.: WO2005/086113

PCT Pub. Date: Sep. 15, 2005

(65) Prior Publication Data

US 2007/0159356 A1    Jul. 12, 2007

(30) Foreign Application Priority Data

Feb. 6, 2004 (FR) .................................. 04 01176

(51) Int. Cl.
*G08B 21/00* (2006.01)

(52) U.S. Cl. .................. 340/945; 340/947; 340/961; 340/963; 340/970; 340/973; 701/9; 701/11; 701/301

(58) Field of Classification Search .................. 340/947, 340/945, 948, 961, 963, 964, 967, 969, 970, 340/973; 701/9, 11, 13, 301
See application file for complete search history.

(56) References Cited

U.S. PATENT DOCUMENTS

| 4,675,675 A * | 6/1987 | Corwin et al. ............. 340/945 |
| 4,729,102 A | 3/1988 | Miller, Jr. et al. |
| 5,933,099 A * | 8/1999 | Mahon ....................... 340/961 |
| 6,246,320 B1 * | 6/2001 | Monroe ...................... 340/506 |
| 6,681,158 B2 * | 1/2004 | Griffith et al. ................. 701/3 |

FOREIGN PATENT DOCUMENTS

| EP | 1 315 315 | 5/2003 |
| FR | 2 814 874 | 4/2002 |
| WO | 2004/008415 A | 1/2004 |

* cited by examiner

*Primary Examiner*—Hung T. Nguyen
(74) *Attorney, Agent, or Firm*—Lowe Hauptman Ham & Berner, LLP

(57) ABSTRACT

The information relates to a method of transmitting information between a communications management unit on board an aircraft and a ground air control system, characterized in that it comprises the following steps consisting, in respect of the communications management unit, in: a) detecting the reception of alerts originating from an onboard surveillance system, via a communication bus, b) when an alert is detected, shaping the information contained in the alert as a report according to a predetermined format, and dispatching this report to the ground system.

6 Claims, 4 Drawing Sheets

AUTOMATIC METHOD FOR TRANSMITTING MONITORING ALARMS FROM AN AIRCRAFT TO THE GROUND

CROSS-REFERENCE TO RELATED APPLICATIONS

The present Application is based on International Application No. PCT/EP2005/0504094, filed on Feb. 4, 2005, which in turn corresponds to FR 04/01176 filed on Feb. 6, 2004, and priority is hereby claimed under 35 USC §119 based on these applications. Each of these applications are hereby incorporated by reference in their entirety into the present application.

FIELD OF THE INVENTION

The invention relates to a method of transmitting information between a communications management unit on board an aircraft and a ground air control system. The invention also relates to a communications management unit of an aeronautical telecommunication network, on board an aircraft and linked to an air control system situated on the ground.

BACKGROUND OF THE INVENTION

The ATN aeronautical telecommunication network makes it possible to ensure reliable ground/onboard digital links for information exchanges between aircraft on the ground or in flight and centers on the ground, whether the centers are endowed with an air traffic control activity, the information exchanged with the air traffic control authorities being termed ATC (the acronym standing for Air Traffic Control), or endowed with an activity of aircraft or flight operation, the information exchanged with the airline or airlines operating the aircraft which may be very diverse being termed non-ATC, the distinction between the two types of information being justified by transmission constraints that differ at the safety and reliability level.

As an example of ATC information, mention may be made of the position, heading and speed of the aircraft, and trajectory modification orders; it may also involve messages exchanged between the pilot and the air traffic controller, these messages being digitized. This information is dispatched periodically according to a predetermined frequency or upon an event.

Like any digital link, the ATN aeronautical telecommunication network allows information exchanges or dialogs between two tasks or applications run by remote processors, in general a processor placed on board an aircraft and a processor placed on the ground. Applications able to hold a dialog between themselves via the aeronautical telecommunication network ATN are termed ATC or non-ATC according to the nature of the information that they exchange.

The ATN aeronautical telecommunication network comprises an aerial part on board each aircraft hooked up and a terrestrial part.

The aerial part is composed of various sender/receiver equipment on board an aircraft. Said equipment is managed on board the aircraft by an automaton referred to as a communications management unit which, in addition to their management, undertakes the initialization, sustaining, completion and routing of a communication, the execution of air traffic control applications like the periodic communication of the position of the aircraft to the ground control and the execution of fleet management applications like the monitoring of the consumption of the aircraft.

The aircraft is generally also equipped with a surveillance system such as for example a $T^2CAS$ system (the acronym standing for the expression "Traffic and Terrain Collision Avoiding System") which provides the pilot with information on the surrounding situation of the aircraft, which allows him to exchange information with other aircraft also equipped with the same system, and which, as appropriate, prompts him with aircraft collision avoidance or terrain avoidance maneuvers. This information intended for the crew is displayed on a ND screen (the acronym standing for the expression "Navigation Display"). Said information is very precise and recalculated each second: the distances are for example indicated with a precision of a few tens of meters.

But the communications management unit and the surveillance system do not communicate: the information of the surveillance system is not automatically transmitted to the air traffic control authority. When an avoidance maneuver is proposed to the pilot by the surveillance system, said maneuver may come into conflict with a previous order from the air traffic control authority. Although the decision concerning the maneuver is up to the pilot, a discussion generally ensues between the pilot and the air traffic control authority; but the latter does not have the same information at its disposal.

Concerning the situation surrounding the aircraft, the air traffic control authority has at its disposal information provided by ground radars: this information is provided only every six seconds and is less precise than that provided by the surveillance system. The air traffic control authority is not furnished in particular with the various choices offered to the pilot, nor of course with the situation surrounding the aircraft as seen from on board.

Furthermore, this vocal exchange between the pilot and the air traffic control authority is a source of delay in the execution of a maneuver which, however, sometimes requires a fast reaction.

An important aim of the invention is therefore to avoid these possible conflicts and source of delay concerning these avoidance maneuvers.

SUMMARY OF THE INVENTION

To achieve this aim, the invention proposes a method of transmitting information between a communications management unit on board an aircraft and a ground air control system, characterized in that it comprises the following steps consisting, in respect of the communications management unit, in:

a) detecting the reception of alerts originating from an onboard surveillance system, via a communication bus, b) when an alert is detected, shaping the information contained in the alert as a report according to a predetermined format, and dispatching this report to the ground system.

According to a characteristic of the invention, it consists prior to the detection of the reception of an alert, in receiving from the ground system a subscription requisition and in carrying out steps a) and b) so long as the subscription requisition is maintained.

This surveillance information is thus transmitted automatically to the ground air traffic control system via the aeronautical telecommunication network; said information allows the air traffic control authority to be furnished almost in real time with the precise situation of the environment of the aircraft as it is perceived by the pilot. The pilot is reassured in the choice of his decision, knowing that the surveillance information is automatically transmitted to the air traffic control authority which can react immediately in case of disagreement.

This makes it possible to increase air safety.

The subject of the invention is also a unit for managing the communications of an aeronautical telecommunication network, on board an aircraft, comprising an area for storing applications, a central unit, a router, and able to exchange information with a ground air control system, characterized in that it comprises means for receiving information originating from an onboard surveillance system, and an application for transmitting this information received to the ground air control system, by means of the central unit and the router.

According to a characteristic of the invention, the means of reception comprise a bus for communication between the onboard surveillance system and the communications management unit.

BRIEF DESCRIPTION OF THE DRAWINGS

Other characteristics and advantages of the invention will become apparent on reading the detailed description which follows, given by way of nonlimiting example and while referring to the appended drawings in which.

DETAILED DESCRIPTION OF THE EMBODIEMENTS

The ATN aeronautical telecommunication network is designed to use the various media envisageable for air/ground links (HF, VHF, S-mode radar, satellite) and to use on the ground data transmission networks, specialized or nonspecialized, switched or nonswitched, based on cable or radio waves, relayed or not by satellite, in order to convey the information transmitted to its destination.

Figure 1:
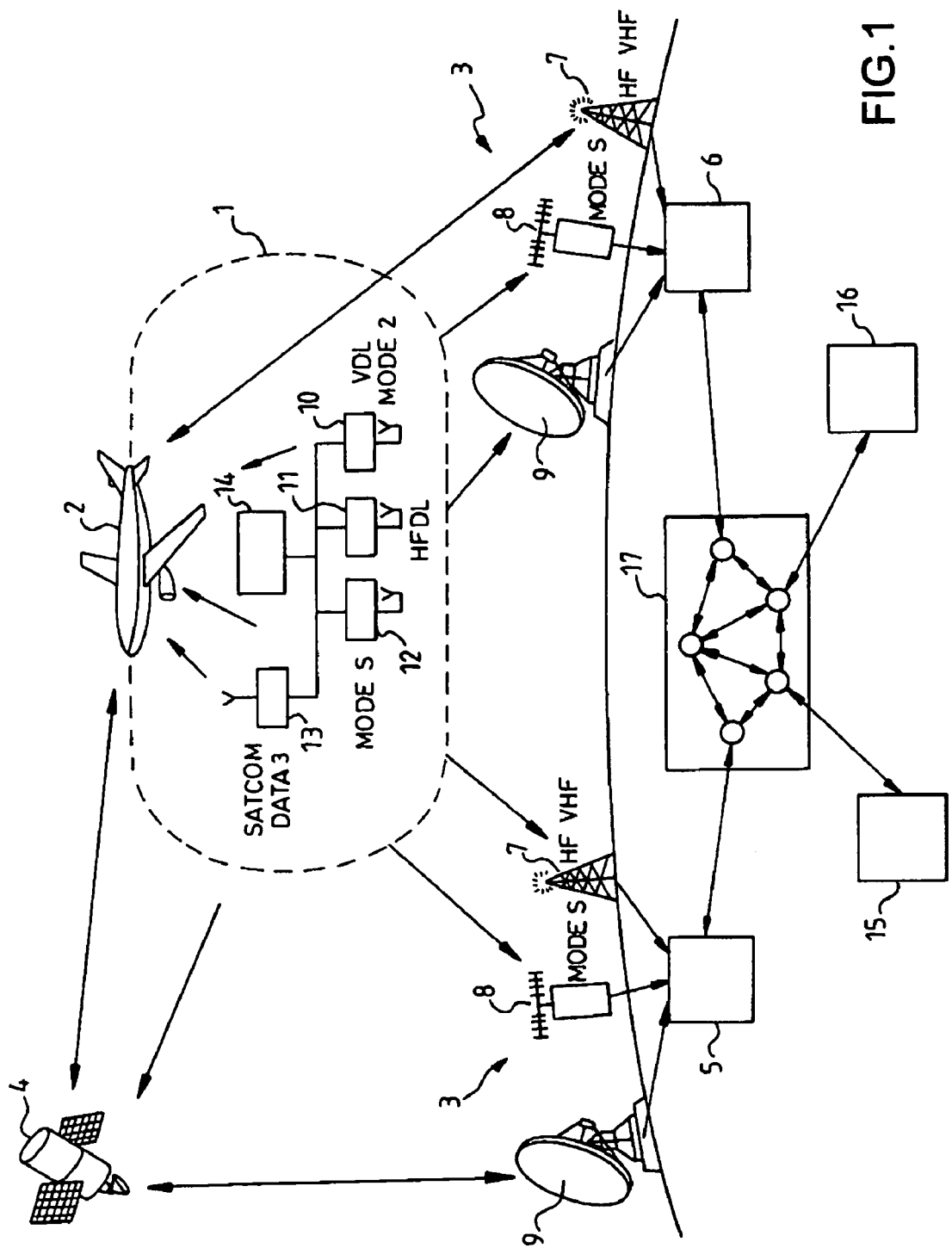
FIG. 1 diagrammatically represents an ATN aeronautical telecommunication network, FIG. 2 diagrammatically represents an exemplary onboard communications management unit of an ATN aeronautical telecommunication network, FIG. 3 diagrammatically represents an exemplary surveillance system, in this instance a $T^2CAS$ system, FIG. 4 diagrammatically represents a $T^2CAS$ surveillance system, linked to an onboard communications management unit in accordance with the invention.

As represented in FIG. 1, the ATN aeronautical telecommunication network comprises an aerial part 1 on board each aircraft 2 hooked up and a terrestrial part 3.

The aerial part 1 is composed of various sender/receiver equipment on board an aircraft 2 and adapted to the various media usable for air/ground communications. The sender/receiver equipment and the corresponding equipment on the ground constitute transmission subnetworks. Represented in FIG. 1 is a sender/receiver 10 constituting a VDL-mode transmission subnetwork head 2 operating in VHF according to a standardized specific protocol, a sender/receiver 11 constituting an HFDL-mode transmission subnetwork head operating in HF according to another standardized specific protocol, a sender/receiver 12 constituting an S-mode transmission subnetwork head operating in UHF in collaboration with a secondary radar according to another protocol likewise standardized and a sender/receiver 13 constituting a Satcom-data-mode AMSS (the abbreviation standing for "Aeronautical Mobile Satellite System") communication subnetwork head 3 operating with a satellite relay 4, according to yet another standardized protocol. These various senders/receivers 10, 11, 12, 13 may exhibit common parts so that the various subnetworks may not all be available simultaneously. They may even not be present entirely on an aircraft, this depending on the degree of equipment of the aircraft considered. They are managed on board an aircraft 14 referred to as a communications management unit which, in addition to their management, undertakes, by manipulation of a memory stack (or router) through which the data to be exchanged with the ground travel, the initialization, sustaining and completion of a communication.

The terrestrial part of the ATN aeronautical telecommunication network is composed of routing ground stations 5, 6. These routing ground stations 5, 6 are equipped with means of ground/air communication, HF/VHF senders/receivers 7, S-mode radar 8, satellite-based terrestrial communication station 9, allowing them to communicate with the aircraft passing in their vicinities according to one or more scheduled modes of communication: Satcom data 3 subnetwork, VDL mode 2 subnetwork, S-mode subnetwork or HFDL-mode subnetwork and linked together and to various ground centers 15, 16 involved in information exchanges with the aircraft, via digital data transmission networks, specialized or nonspecialized, switched or nonswitched, using cable or radio waves relayed or not by satellite.

The recommendations of the ICAO (the acronym standing for International Civil Aviation Organization) fix in detail, in a constraining manner, the procedure for managing communications through the ATN aeronautical telecommunication network, essentially, the addressing, setting up, sustaining and completion of a communication, and the so-called "ATC" applications fulfilling tasks entailing exchanges of information of ATC type through the ATN aeronautical network. On the other hand, they do not involve the other so-called "non-ATC" applications fulfilling tasks not entailing exchanges of information of ATC type through the ATN aeronautical telecommunication network.

Figure 2:
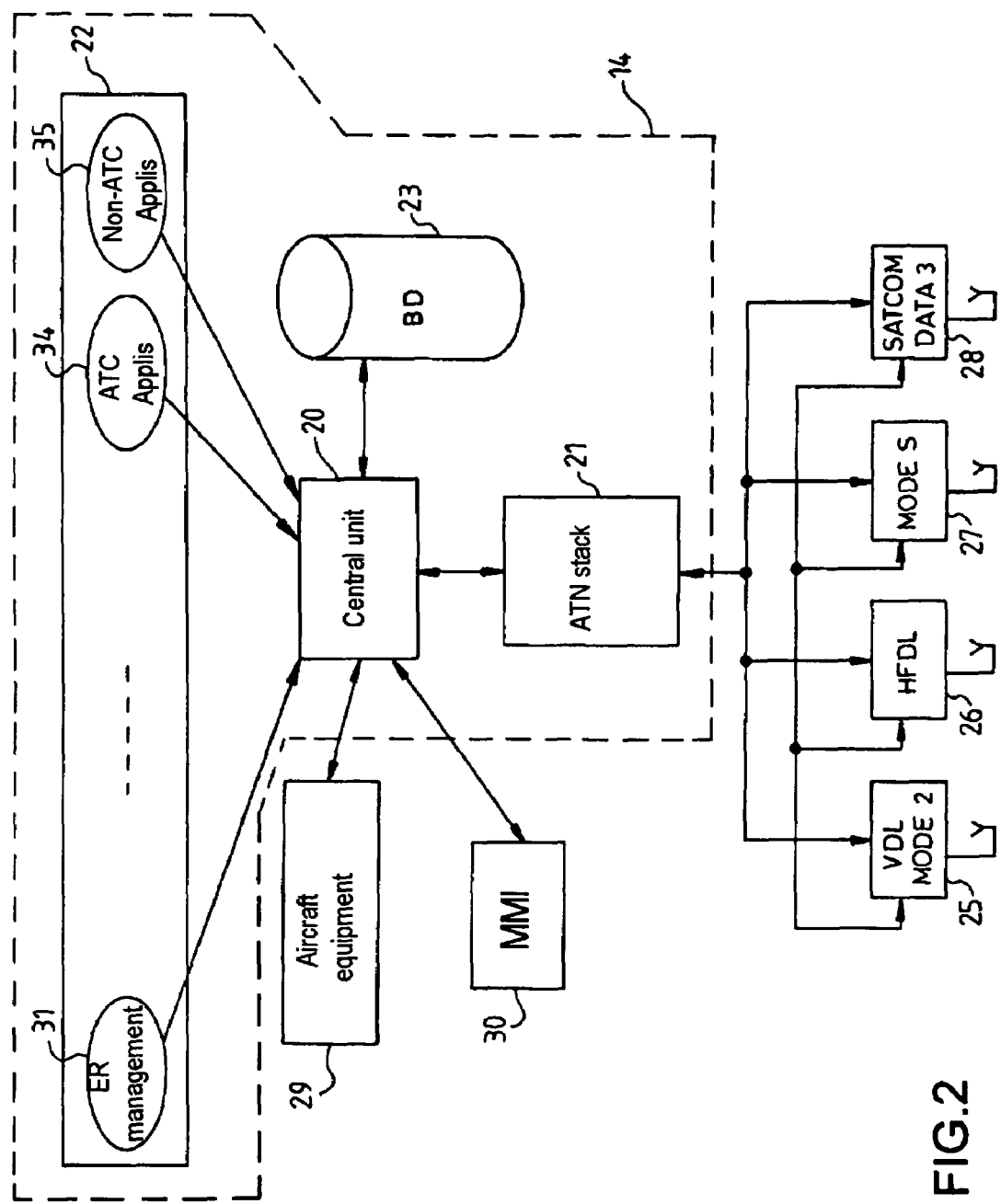

FIG. 2 illustrates, diagrammatically, an exemplary hardware and software architecture for an ATN aeronautical telecommunication network communications management unit 14.

This communications management unit 14 consists, as usual, of a specialized computer with a central unit 20, a memory and input/output interfaces.

The memory comprises various parts, chiefly including:
- an ATN stack 21 termed a router with registers whose manipulation by the central unit 20 allows application of the transmission protocols of the ATN network both in order to produce the data stream sent from on board to the ground on the basis of the information to be transmitted and service information used for the setting up, sustaining and conclusion of a link within the ATN network, and for the extraction of the information contained in the data stream received on the ground in the course of a link and redirections thereof to the onboard equipment concerned,
- a part 22 used for the storage of various applications, and
- a part 23 used for the storage of a database on the ATN network.

The input/output interfaces link the communications management unit with various items of equipment of the aircraft which are essentially:
- the sender/receiver systems 25, 26, 27, 28 of the aircraft playing the role of heads of air/ground communication subnetworks for the ATN network,
- the equipment 29 of the aircraft being able to be made to use the ATN network to exchange information with the ground, and at least one IHM man/machine interface 30 such as, for example, the MCDU ("Multipurpose Control Display Unit"), allowing a dialog of the communications management unit with the crew of the aircraft so that the latter can give their setpoints to the communications management unit and glean various information therefrom on the state of the links set up through the ATN network.

Among the applications stored in the part 22 of the memory of the communications management unit and executed under time sharing by its central unit 20, are conventionally found:

an application 31 for managing and distributing tasks managing the activities of the various onboard senders/receivers 25, 26, 27, 28 which can serve as communication subnetwork head, an "ATC Applis" application 34 charged with the execution of tasks pertaining to air traffic control, and "non-ATC Applis" applications 35 charged with the execution of tasks pertaining to the management of the flight and the aircraft.

These various applications are designed by specialists in software engineering taking account both of the specific features of the equipment on board the aircraft, of the standardized protocols of the ATN network and of the desiderata of the air traffic control authorities and of the airline operating the aircraft.

At the present time, once one of the "ATC Applis" applications 34 has determined the need for a link with the ground by way of the ATN network, it calls directly upon the ATN communication stack for the setting up of the link. The message is then relayed gradually within the network to the remote terminal requested.

We shall describe a $T^2CAS$ system as an exemplary surveillance system, but the invention applies to any other equivalent surveillance system.

A $T^2CAS$ system gives the pilot cautions regarding the risks of conflict with the terrain and with other aircraft; the latter are equipped with repeaters comprising an SSR (the acronym standing for the expression Secondary Surveillance Radar).

The system firstly calculates not the distance but the time to reach the point of maximum approach or CPA (the acronym standing for the expression Closest Point of Approach) of another aircraft, by dividing the oblique distance between two aircraft by the approach speed. The system then sends two types of alert for the attention of the pilot, as a function of the time obtained and of the flight altitude of the aircraft SL (the acronym standing for the expression Special Ledge); recommendations on avoidance maneuvers or RA (the acronym standing for the expression Resolution Advisory) and cautions regarding the surrounding traffic or TA (the acronym standing for the expression Traffic Advisory). These cautions aid the pilot to visualize the aircraft approaching, and prepare him for a possible avoidance maneuver. These alerts are displayed on a screen and announced orally. The pilot is thus furnished with information on the surrounding traffic, which information is displayed on another screen.

Figure 3:
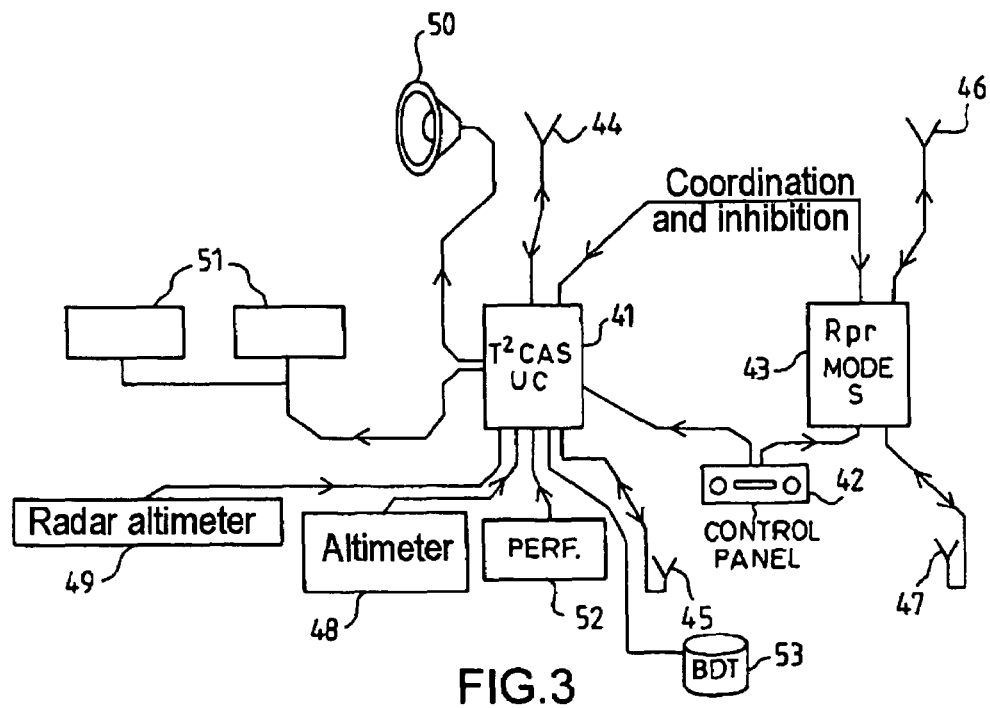

The $T^2CAS$ system typically comprises, as represented in FIG. 3:

a central unit 41 which undertakes the surveillance of the air space and of the terrain, the tagging of aircraft approaching, the detection of threats, the determination of avoidance maneuvers and the generation of alerts, a control panel 42 of the $T^2CAS$ system, included in that of the repeater 43 of the aircraft and which comprises a selector with three positions: off, TA mode, or automatic mode, that is to say TA and RA, two antennas 44, 45 distinct from the antennas 46, 47 of the repeater, a connection with the S mode of the repeater 43 to obtain complementary RA alerts coordinated with those originating from the $T^2CAS$ system of another aircraft, a connection with an altimeter 48 to obtain the theoretical altitude (altitude pressure), a connection with a radar altimeter 49 to inhibit the RA alerts when the aircraft is in proximity to the ground and/or to determine whether the aircraft detected by the $T^2CAS$ system are on the ground, loudspeakers 50 for the oral announcements, display screens 51 for the relevant data, a connection with a device 52 providing the performance of the aircraft, a connection with a terrain database 53 providing the relief of the terrain.

The $T^2CAS$ system is not connected to the automatic pilot or to the FMS flight computer (the acronym standing for the expression Flight Management System) with which the aircraft is equipped. And it operates independently of the ground systems.

Figure 4:
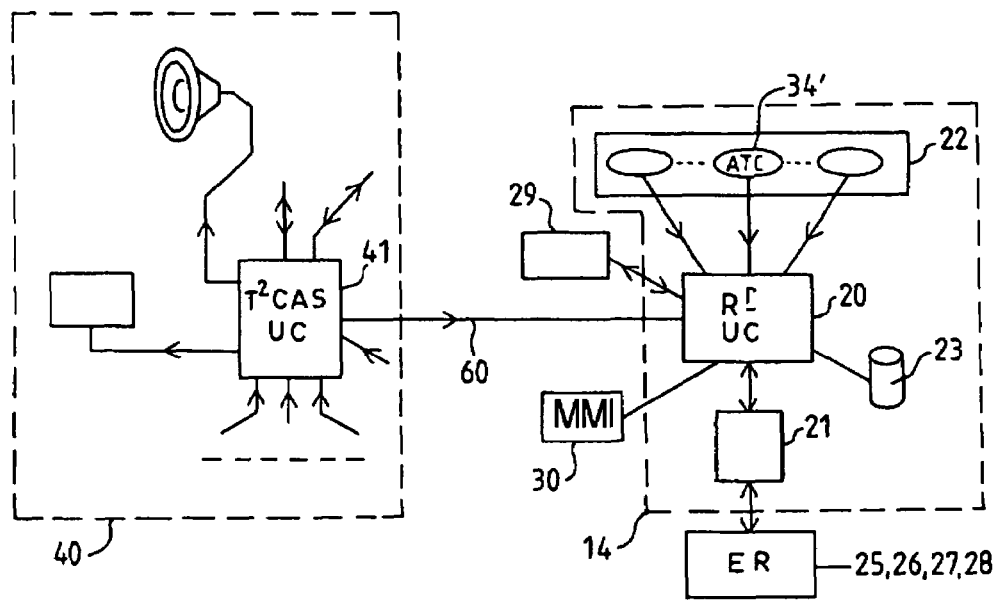

According to the invention, a communication bus 60, represented in FIG. 4, links the sender $T^2CAS$ system 40 to the communications management unit 14 which is then receiver; more precisely this bus 60 links the central unit 41 of the $T^2CAS$ system to the central unit 20 of the communications management unit.

When an alert is sent by the $T^2CAS$ system, said alert is then also transmitted to the communications management unit via this bus.

The "ATC-Applis" application of the communications management unit comprises a new application dedicated to the transmission of the alerts to the ground; the corresponding ground system then comprises a new application dedicated to the reception of these alerts. According to a variant of the invention, this new application of the unit 14 is an extension of the existing ATC application, charged with the sending of reports to the ground (position, route followed, etc.). This extended ATC application is referenced 34'. The reports are sent to the ground following a prior subscription requisition originating from the ground. This subscription requisition comprises a request to dispatch alerts originating from the surveillance system, and indicates the address of the ground system to which to dispatch these alerts.

Figure 5:
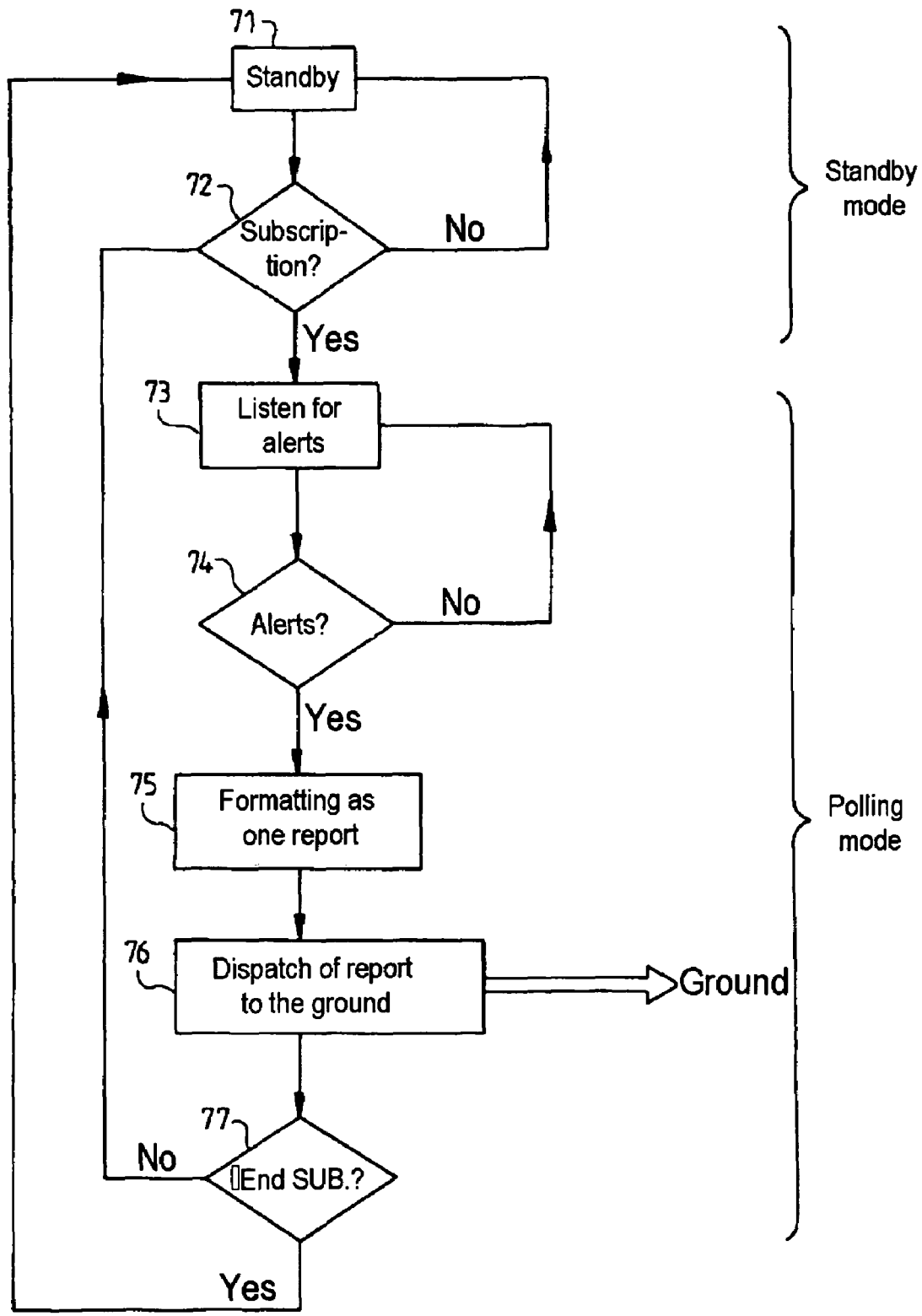
FIG. 5 represents in the form of a flowchart, an exemplary transmission by the communications management unit, of an alert emitted by the $T^2CAS$ surveillance system.

The flowchart of FIG. 5 illustrates the principal steps of this application.

This new application 34' comprises two modes of operation, a standby mode and a polling mode.

The standby mode at 71 corresponds to the initial state. The application remains inactive so long as no subscription requisition has been received on the part of the ground system of the air traffic controller. This makes it possible to avoid using the resources of the communications management unit, if this is not necessary. During reception via a receiver 25, 26, 27 or 28 of a ground subscription requisition at 72, the communications management unit then passes to the polling mode; the on board ATC application is in fact still available.

In polling mode, the communications management unit starts listening at 73 for alerts which might be sent by the surveillance system. This listening is carried out permanently, on the communication bus which links the $T^2CAS$ surveillance system (sender) to the communications management unit (receiver). The polling on the communication bus is a low-level input/output function of the communications management unit, which is not penalizing in terms of processing time and of usage of the resources of the communications management unit. As soon as an alert is sent at 74 by the surveillance system, said alert is detected by the communications management unit. At 75 the information that it contains is then shaped, by the ATN router 21, into a report which is dispatched at 76 to the homologous ground system via a sender 25, 26, 27 or 28; this information is shaped according to a determined protocol. This report may contain the situation surrounding the airplane (position of the other airplanes) as well as the avoidance maneuver proposed. This mode is sustained so long as the ground system remains subscribed as indicated at 77. If a subscription cancellation message is received, the communications management unit then reverts to standby mode at 71, otherwise the communications management unit reverts to listening mode at 73.

As soon as the air traffic control authority so requests, the surveillance information is thus relayed automatically to the ground air traffic control system via the communications management unit and the aeronautical telecommunication network; said information allows the air traffic control authority to be furnished almost in real time with the precise situation of the environment of the aircraft as it is perceived by the pilot. The pilot is reassured in the choice of his decision, knowing that the surveillance information is automatically transmitted to the air traffic control authority which can react immediately in case of disagreement.

This makes it possible to increase air safety.

The invention claimed is:

1. A method of transmitting information between a preexisting communications management unit on board an aircraft and a ground air control system, comprising the following steps:
   a) detecting the reception of alerts originating from an onboard surveillance system when the aircraft is on an initial route, via a communication bus,
   b) when an alert is detected, shaping the information contained in the alert as a report according to a predetermined format; and
   c) dispatching said report to the ground system.

2. The method as claimed in claim 1, further comprising prior to the detection of the reception of the alert, in receiving from the ground system a subscription requisition comprising an alerts dispatch request and an address of the ground system, so long as the subscription requisition is maintained.

3. A unit for managing the communications of a preexisting aeronautical telecommunication network, on board an aircraft, comprising:
   an area for storing applications, wherein each application is charged with specific execution of tasks:
   a central unit;
   a router; and
   an equipment for exchanging information with a ground air control system, and
   means for receiving information originating from an onboard surveillance system when the aircraft is on an initial route, wherein the application for transmitting the information received to the ground air control system, by means of the central unit and the router.

4. The communications management unit as claimed in the claim 3, wherein the means of reception comprise a bus for communication between the onboard surveillance system and the communications management unit.

5. The communications management unit as claimed in claim 3, wherein the information originating from the surveillance system is terrain avoidance and/or traffic avoidance alerts and/or weather alerts.

6. The communications management unit as claimed in claim 4, wherein the information originating from the surveillance system is terrain avoidance and/or traffic avoidance alerts and/or weather alerts.

* * * * *